United States Patent [19]

Lyth et al.

[11] 3,715,013
[45] Feb. 6, 1973

[54] LUBRICANT INJECTOR

[75] Inventors: William Lyth, Cleveland; Roy Smith, Washington Court House, both of Ohio

[73] Assignee: Eaton Corporation, Cleveland, Ohio

[22] Filed: Aug. 19, 1971

[21] Appl. No.: 173,169

[52] U.S. Cl. .................... 184/7 D, 184/7 E, 222/335
[51] Int. Cl. ............................................. F16n 25/00
[58] Field of Search ............... 184/7 D, 7 E; 222/335

[56] References Cited

UNITED STATES PATENTS

| | | | |
|---|---|---|---|
| 3,393,841 | 7/1968 | Brehmer | 222/335 |
| 2,905,270 | 9/1959 | Jackson | 184/7 E |
| 3,209,956 | 10/1965 | McKenzie | 222/335 X |
| 3,581,845 | 6/1971 | Nederynen | 184/7 D |
| 3,587,782 | 6/1971 | Russell | 184/7 D |

*Primary Examiner*—Manuel A. Antonakas
*Attorney*—Leslie H. Blair et al.

[57] ABSTRACT

A lubricant meter valve of the injector type comprising a generally cylindrical body having a central axial cavity therethrough and a slidable differential-area piston therein. The piston has an axial bore therethrough and carries a forwardly opening poppet which is spring biased to a closed position. The application of pressure lubricant to the inlet side of the cavity is effective to first move the piston and poppet forwardly injecting lubricant out the outlet and then to unseat the poppet, closing the outlet and allowing lubricant to flow through the piston bore forcing the piston backwardly thus recharging the meter valve.

28 Claims, 10 Drawing Figures

INVENTORS
WILLIAM LYTH
ROY SMITH

ATTORNEYS

INVENTORS
WILLIAM LYTH
ROY SMITH

ATTORNEYS 3,715,013

LUBRICANT INJECTOR

BACKGROUND OF THE INVENTION

1. Field of the Invention

This invention relates to single line type lubrication valves and more particularly to lubrication valves of the metering injection type.

2. Prior Art

The prior art has included many variations of the single line lubricant injector valve. The prior art devices have included valves having many moving parts, valves dependent upon spring forces to inject or recharge, and valves requiring costly, complicated and close machining tolerances.

The prior art valves have not been totally satisfactory as they were complicated and expensive to manufacture, did not positively act in response to applied lubricant pressure but rather required reaction forces such as springs. The valves also were difficult or impossible to adjust and were generally not suitable for single and/or manifold operation. In general the prior art designs were also unsuitable for both liquid and/or non-liquid lubricants.

SUMMARY OF THE INVENTION

In accordance with the present invention, the disadvantages of the prior art valves have been overcome by a novel lubricant injector which is inexpensively produced, operated positively by lubricant pressure, easily and accurately adjustable, is suitable for single or manifold block operation and is equally suited for liquid or non-liquid lubricants.

The above is accomplished by providing an injector comprising a generally hollow cylindrical housing having a slidable piston therein. The piston has a centrally located bore therethrough which is closed at its forward end by a forwardly opening poppet. A single spring biases both the piston towards the inlet and the poppet into a closed position. A metered quantity of lubricant is stored in a charging chamber located forwardly of the piston. Pressurized lubricant introduced to the inlet end of the piston is effective to initially move the piston and poppet forwardly as a unit towards the outlet against the spring bias thereby injecting lubricant from the injector charging chamber. Continuing pressure forces the poppet to move forwardly away from the piston into a position opening the bore and sealing the outlet. Lubricant flows through the bore driving the piston backwards and recharging the charging chamber. Upon termination of pressure the poppet snaps back under spring bias and the injector is ready for the next cycle. The volume of the charging chamber is easily adjustable providing an easily adjustable metered quantity of lubricant to be injected by the injector. The inlet to injector is suitable for individual or common connections rendering the injector suitable for single or manifold applications.

An object of this invention is to provide an improved single line lubricator of the metered injection type.

Another object is to provide an improved, inexpensively produced lubricant injector.

A further object is to provide an improved, inexpensively produced lubricant injector having only two moving parts, namely a piston and a poppet.

A further object of this invention is to provide a lubricant injector suitable for manifold or single valve applications.

Another object is to provide a lubricant injector capable of supplying an easily adjustable metered quantity of lubricant to a member to be lubricated.

Other objects and advantages of the invention will become apparent from the following detailed description taken in connection with the accompanying drawing.

DESCRIPTION OF THE PREFERRED EMBODIMENTS

Embodiment I

One embodiment of the present invention may be seen by reference to FIGS. 1–5.

Figure 1:
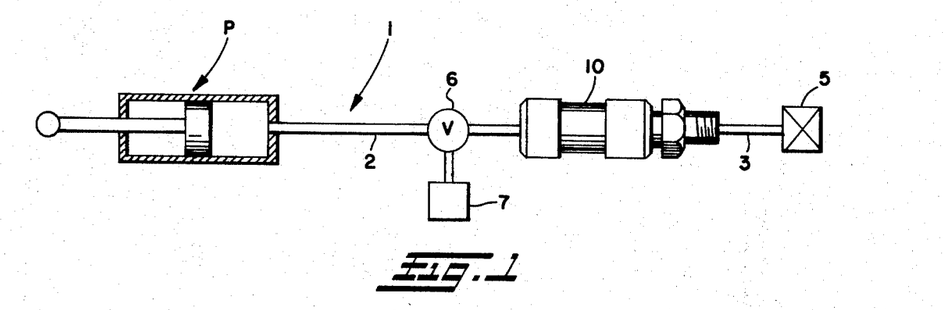
FIG. 1 is a schematic illustration of a typical lubrication system utilizing the present invention.

FIG. 1 illustrates a typical single line lubrication system 1 utilizing the present invention. System 1 comprises a source of intermittently pressurized lubricant such as pump P connected by conduit 2 to the injector 10. The injector 10 is connected by conduit 3 to a member to be lubricated such as bearing 5. Interposed pump P and the injector 10 is a two-stage pressure relief valve 6. The two-stage relief valve 6 is operable to open line 2 to reservoir 7 when the lubricant pressure in line 2 exceeds a predetermined maximum. The relief valve 6 will not close again until the lubricant pressure in line 2 falls below a second predetermined pressure level. The function of pressure relief valve 6 in connection with injector 10 will be discussed in detail below.

Details of injector 10 may be seen by reference to FIGS. 2–5 in which the injector comprises a two-piece body 12 having a forward body portion 14 which is threadably engaged with rearward body portions 16 at threads 18. Intermittently pressurized conduit 2 is received in inlet 20 while conduit 3 leading to the member to be lubricated 5 is received in outlet 22. Running axially from the inlet 20 to the outlet 22 is generally cylindrical body cavity 24. Cavity 24 includes a reduced diameter inlet portion 26, an enlarged diameter central portion 28 and a reduced diameter outlet portion 30. The rearward end of enlarged diameter portion 28 is vented to atmospheric pressure by means of bore 32 communicating with threads 18 leading to the atmosphere.

Figures 2, 2A:
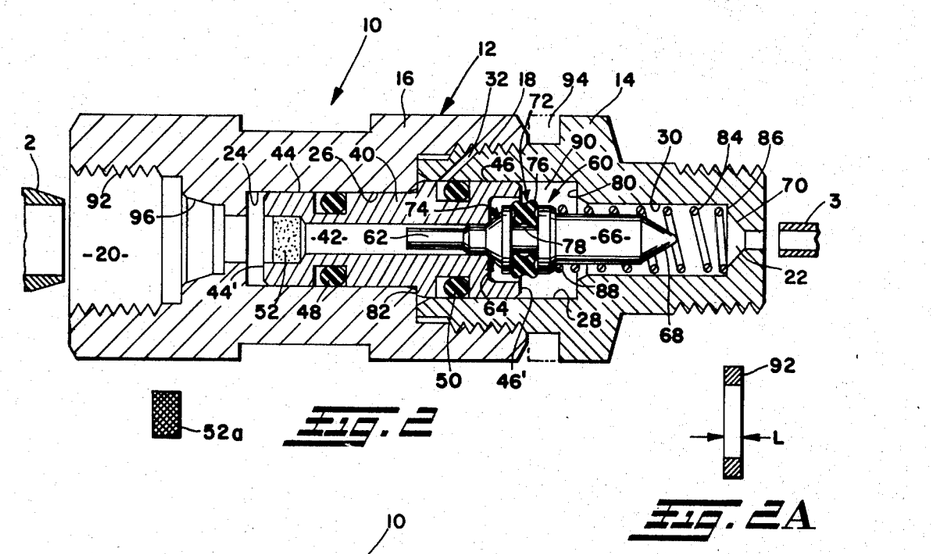
FIG. 2 is a cross-sectional view of one embodiment of the present invention in a first operational position.
FIG. 2A is an illustration of a washer type insert that may be utilized in the present invention.
Figure 3:
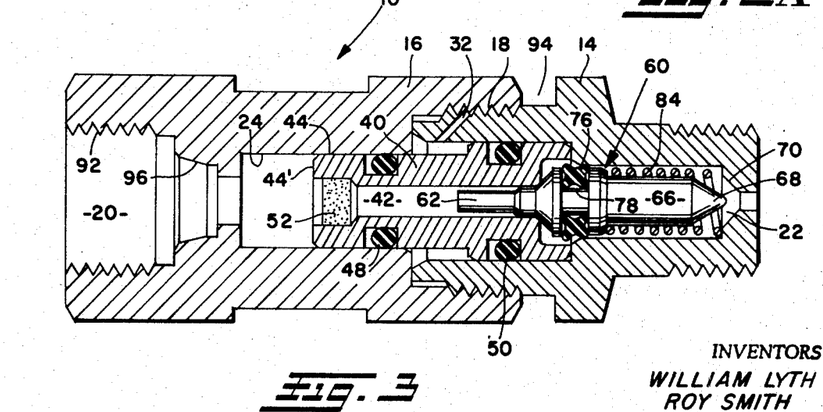
FIG. 3 is a cross-sectional view of the injector of FIG. 2 in a second operational position.

Slidably and sealingly disposed within cavity 24 is differential area piston 40. Piston 40 includes an axial bore 42 therethrough. The piston has a reduced exterior diameter section 44 sealingly and slidingly engaging cavity portion 26 and an enlarged exterior diameter section 46 sealingly and slidingly engaging cavity portion 28. O-rings 48 and 50 effectively seal the interface between piston sections 44 and 46 and cavity portions 26 and 28 respectively. The O-rings 48, 50 may be of any suitable material but preferably are of polyurethane rubber with molybdenum disulfide filler which minimizes frictional drag thus minimizing the chances of damaging O-ring extrusion.

At the inlet end of piston bore 42 is a sintered bronze filter pellet 52 which serves two important functions, one filtration of incoming lubricant and two snubbing of possible pressure surges experienced in line 2. As the injector 10 is suitable for both non-liquid and liquid lubricant a perforated metal plug 52' may be used in place of sintered bronze plug 52 when heavier grease is used.

Extending from the outlet end of piston bore 42 is forwardly opening poppet 60. Poppet 60 includes a rearwardly extending axial portion 62 which is received in bore 42. Rearwardly extending axial portion 62 is closely but not sealingly fitted to bore 42 to guide poppet 60 as it moves axially away from and towards poppet seat 64 located at the extreme outlet end of bore 42. The close fit is also helpful as a snubber of pressure surges in line 2.

Poppet 60 also carries a forwardly extending projection which is freely slidable in cavity section 30 and has a forwardly closing poppet surface 68 for engagement with outlet poppet seat 70 located at outlet 22.

Interposed the axially extending portions 62 and 66 is a valving section 72 which carries forwardly opening poppet surface 74 which cooperates with poppet seat 64 to control lubricant flow through piston bore 42. Located slightly forward of poppet surface 74 is quad-ring 76 which is located in poppet groove 78. Quad-ring 76 may be of any material but preferably is molybdenum disulfide filled to minimize friction and improve wear and is slidably and sealingly engagable in cavity portion 30.

Annular shoulders 80 and 82 located at the intersections of cavity portions 28 and 26 and cavity portion 28 and 30 respectively limit the forward and rearward motion of piston 40 by engagement with piston section 46.

Spring 84 is received between spring seat 86 at outlet 22 and spring seat 88 at poppet valving section 72 to bias both the poppet 60 into contact with poppet seat 64 and the piston 40 rearward into contact with shoulder 82.

In operation, the injector 10 is shown at rest in FIG. 2. In this position charging chamber 90, located ahead of piston 40 in cavity 24, is filled with lubricant and line 2 contains unpressurized lubricant. As a result of the spring bias poppet 60 is seated and piston 40 is in rearward most position. It is important to note that several annular washertype spacer inserts 92 may be placed in the exterior annular groove 94 formed between body portions 14 and 16. (See FIG. 2A). By using spacers 92 of varying axial length L the body portion 14 is variably extended forwardly of body portion 16 and thus the capacity of charging chamber 90 is selectively varied. By this means the injector 10 is easily adjusted to supply a variable metered supply of lubricant to bearing 5. The spacers 92 may be color coded as to axial length L thus giving a visual indication of the metered volume of lubricant to which the injector is set.

As pump P is actuated, pressurized lubricant flows through line 2 to inlet 20 and from there into cavity portion 26. The pressurized lubricant acts upon rear differential-area piston surface 44' to shift piston 40 and poppet 60 forward to the position seen in FIG. 3. In this position the quad-ring 76 has just engaged cavity section 30 and effectively sealed the outlet 22 from cavity section 28. The lubricant present in charging chamber 90 has been injected to bearing 5 and the basic lubricant discharge is complete and is the result of positive action in response to lubricant pressure. No flow occurs through piston bore 42 as the poppet 60 and the piston 40 move forward as a unit. This is due to the considerably larger effective area of piston face 44' exposed to the same lubricant pressure. The spring bias is thus much more effective to hold the poppet in its seated position against lubricant pressure than to hold the piston-poppet unit in its rearwardly position. Experimental testing has indicated a rear piston face effective area to poppet effect area ratio in the range of 20:1 to 2:1 is satisfactory with a preferred ratio of about 12 ½:1.

Figure 4:
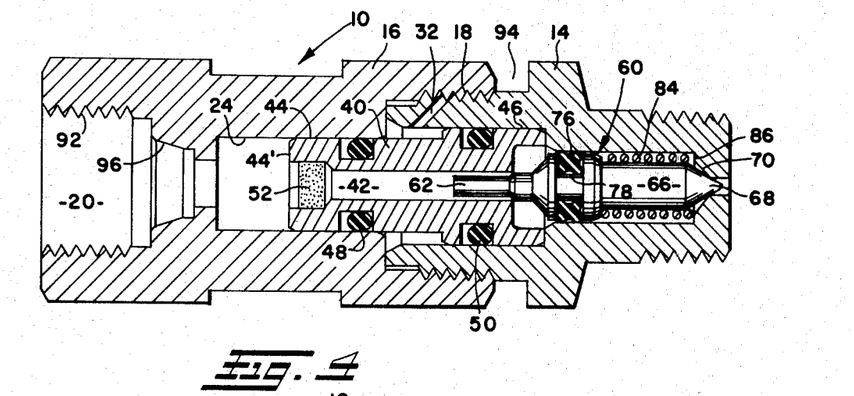
FIG. 4 is a cross-sectional view of the injector of FIG. 2 in a third operational position.

As pressure is continuously applied the injector moves into the position of FIG. 4. In this position the forward end of piston 40 has engaged shoulder 80 and the piston is prevented from further forward movement. The poppet 60 is driven forward under lubricant pressure to a point at which quad-ring 76 is firmly sealingly engaged with cavity section 30 and forwardly closing poppet surface 68 is firmly engaged with outlet poppet seat 70 thus providing a positive double seal between charging chamber 90 and outlet 22. The forwardly opening poppet surface 74 has moved away from piston bore poppet seat 64 and pressurized lubricant begins to flow through plug 52 and bore 42 into the charging chamber 90 to equalize pressure on both ends of the piston 40.

Figure 5:
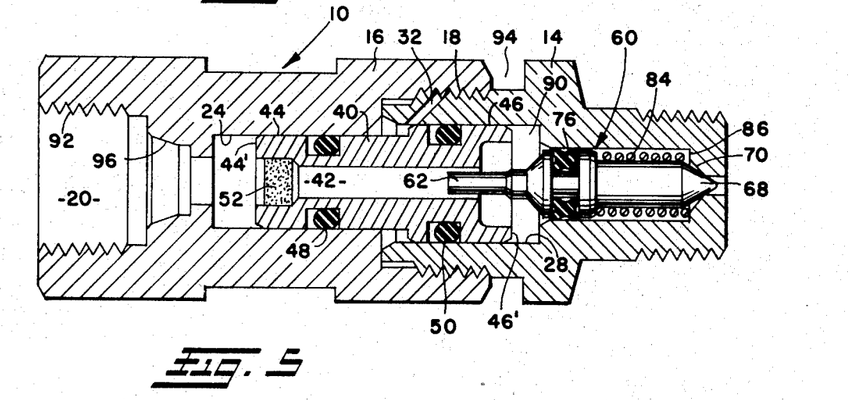
FIG. 5 is a cross-sectional view of the injector of FIG. 2 in a forth operational position.

As pressure is maintained the injector moves to the position shown in FIG. 5. The effective area of rearward piston face 44' is somewhat smaller than the effective area of forward piston face 46' and thus the equal pressures on both sides of the differential area piston will result in an unbalanced force driving the piston rearwardly while the lubricant pressure will also maintain poppet 60 in its shown or forward position. Piston 40 will move rearwardly until it engages shoulder 82 and thus charging chamber 90 will be filled with a metered quantity of lubricant. The ratio of forward to rear piston faces is preferably in the range of 2:1 to 1.1:1. As pressure continues to build to a predetermined maximum, relief valve 6 will open relieving pressure on the injector and poppet 60 will snap back under spring bias to the at rest position of FIG. 2. As the pump P discontinues action the pressure in line 2 will fall below a preselected minimum pressure level causing relief valve 6 to close and the total system 1 will be set for its next cycle. The preselected minimum pressure level is somewhat below that pressure level required to hold poppet 60 in its forward position as shown in FIG. 4.

Differential area piston is vented to atmosphere as at 32 described above and is thus free of any pressure effects excepting that of incoming lubricant from line 2.

It is noted that the injector is equipped with tube fittings 94 and a tube seat configuration 96 at its inlet end and is thus easily adapted to either tube or pipe thread connections.

At this point it may be seen that the injector 10 is of simple construction having only two moving parts, namely piston 40 and poppet 60. The injector requires only one spring 84. The injector is also positively operated as the result of fluid pressures acting on differential areas to both inject and recharge the valve 10.

Embodiment II

Figure 6:
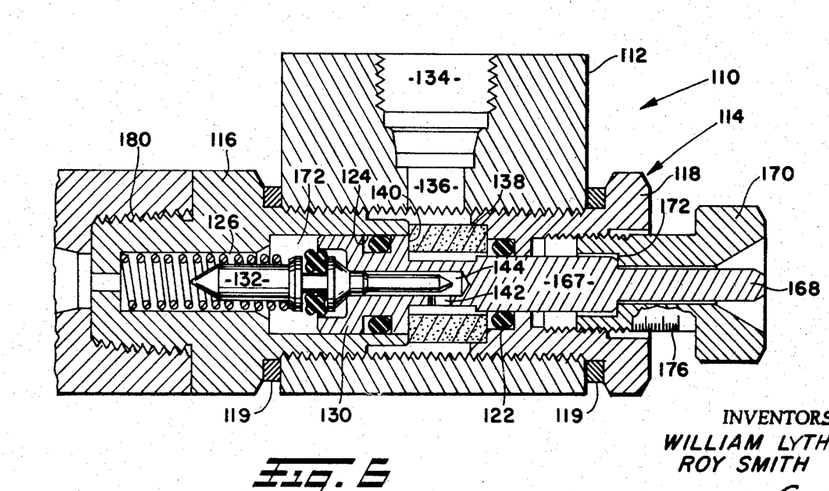
FIG. 6 is a cross-sectional view of a second embodiment of the present invention.

A second embodiment of the present invention may be seen by reference to FIG. 6. The functional details and operational sequence of the injector of FIG. 6 is identical to that of injector 10 shown in FIGS. 1-5 and will not be described in detail herein.

This injector 110 includes an inlet housing 112 and a two-piece body housing 114. Body housing 114 includes a forward piece 116 and a rearward piece 118 threadably and coaxially received in inlet body housing 112. The body housing 114 is sealed to the inlet housing 112 by seals 119. The body housing 114 has an axial cavity 120 therethrough containing rearward reduced diameter section 122, middle enlarged diameter section 124 and forward reduced diameter section 126.

The moving parts, differential area piston 130 and poppet 132 serve the same function as previously discussed piston 40 and poppet 60.

Pressurized lubricant entering inlet 134 passes through radial passage 136 to cavity section 124. A filter pellet 138 similar to filter pellet 52 above is interposed passage 136 and cavity section 124.

The intermittently pressurized lubricant in cavity section 124 acts directly upon rear piston face 140 and enters the radial inlet 142 to piston bore 144 as shown.

Piston 130 includes a rearwardly extending axial projection 167. The projection includes a stepped down portion 168 which extends through end plug 170 which is threadably engaged in body piece 118. Plug 170 has a shoulder 172 which engages piston projection 167 and may be used to urge piston 130 forward thereby adjusting the metered charge of lubricant in charging chamber 172. The end of projection portion 168 is clearly visible through plug 170 and serves as a visual indication of injector 110 operation. Plug 170 may carry calibration markings 176 which serve as a visual indication of the metered volume to which injector 110 is set.

As is shown, the outlet end of the forward housing body piece 116 may be threaded directly into a bearing mount as at 180.

Embodiment III

Figure 7:
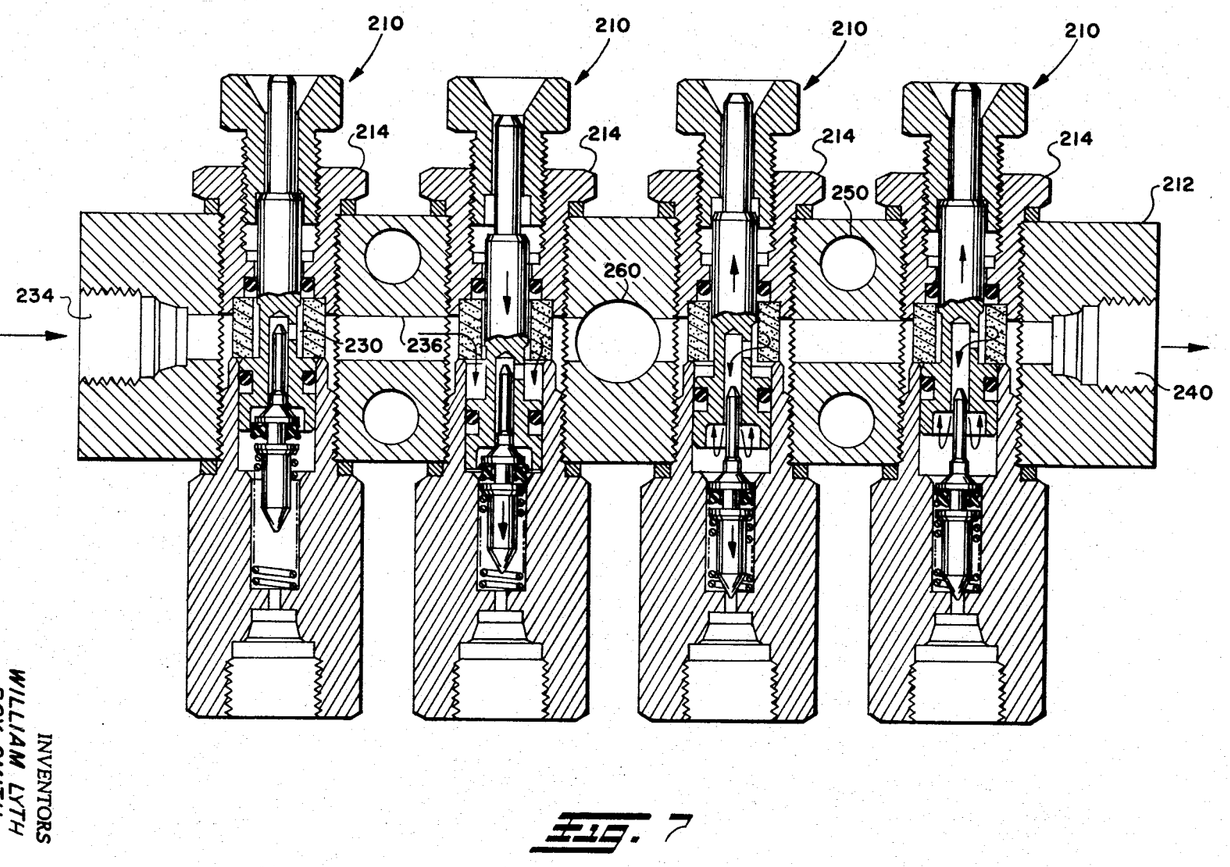
FIG. 7 is a cross-sectional view of a third embodiment of the present invention.

A further embodiment of the present invention may be seen by reference to FIG. 7 which is a modification of the injector of FIG. 6.

In this embodiment the injectors 210 comprise body housings 214 mounted in a manifold block 212 which is very similar to inlet housing 112 above. The inlet 234 is connected to a bore 236 which leads to and is common with the body cavity sections 230 of all injectors 210 in the block. An outlet 240 from manifold bore 230 may lead back to a lubricant reservoir, or to additional manifold blocks. Outlet 240 may also be plugged.

The detailed configurations and operations of injectors 210 are identical to that of injector 110 above and will not be described herein.

Mounting holes 250 may be provided for mounting the manifold block 212 to a machine housing or the like.

Figure 8:
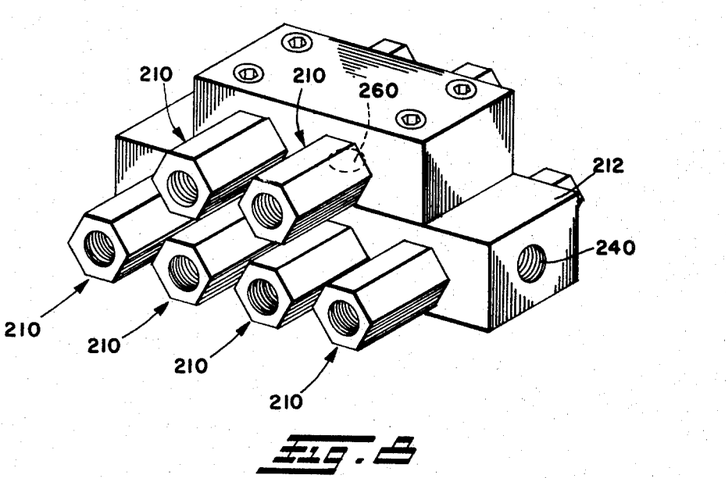
FIG. 8 is a perspective view of a modification of the injector of FIG. 7.
Figure 9:
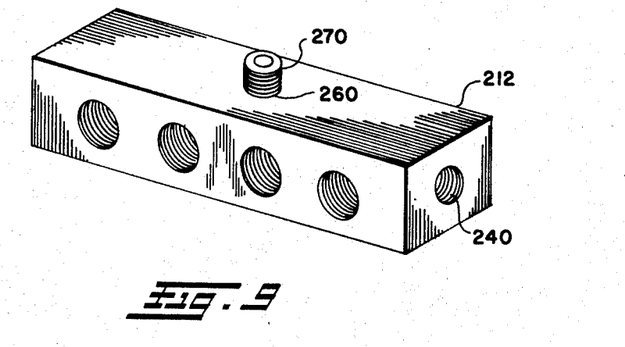
FIG. 9 is a perspective view of a further modification of the injector of FIG. 7.

A central pressure tap 260 is connected to bore 212 and may be plugged, used to supply pressurized lubricant to an additional stacked manifold block as shown in FIG. 8, or may carry an indicating device 270 as shown in FIG. 9. Indicating device 270 may be an electrical sensing element or a mechanical indicating stem.

Although this invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

We claim:

1. A lubricant injector comprising:

a hollow body having an inlet for connection to a source of intermittently pressurized lubricant and an outlet, said hollow body defining a rearward chamber adjacent the inlet, a foreward chamber adjacent the outlet, and a central chamber interposed said forward and rearward chambers, said central chamber having a larger interior diameter than said forward and rearward chambers thereby defining a first and second shoulder at the intersections of the central chamber with the forward and rearward chambers respectively, a piston slidably and sealingly disposed within said body, said piston having a smaller diameter section disposed in said rearward chamber, and a larger diameter section disposed in said central chamber, said piston limited in its forward and rearward axial movement by said larger diameter section contacting said first and second shoulders, said piston having a first face at its rearward end and a second larger face at its forward end, said piston and said central chamber defining a charging chamber ahead of its second face when said piston is in its rearward most position, said piston having an axial bore therethrough with a poppet seat at its forward end;

a valving element cooperating with said poppet seat for controlling the flow of lubricant through said bore, said valving element having a rearwardly extending projection slidably received in said piston bore, a forwardly extending projection for sealing and sliding engagement in said forward chamber and a forwardly opening poppet surface interposed said projections for engagement with said poppet seat; the effective area of said poppet exposed to fluid pressure in said bore being substantially smaller than said first piston face; and means biasing said valve member rearwardly to seat said poppet surface on said poppet seat and biasing said piston rearwardly to engage said second shoulder.

2. The injector of claim 1 wherein lubricant pressure at said inlet sufficient to overcome said bias is operable to:

a. upon initial application of pressure move said piston and valving element forward in unison injecting lubricant from said charging chamber out said outlet, b. upon continued application of pressure effect engagement of said piston with said first shoulder thereby stopping said piston and forcing said valving element forward to disengage said poppet surface from said poppet seat opening said piston bore and forcing said forward projection into said forward chamber sealing said outlet, c. upon further application of pressure equalizing pressure on both faces of said piston thereby driving said piston rearwardly to engage said second shoulder and recharge said charging chamber, and d. upon termination of pressure allowing said bias to return said valving element poppet surface to seat on said poppet seat and completing the injecting cycle.

3. The lubricant injector of claim 1 wherein said valving element rearward projection is closely fitted in said piston bore to effectively guide said valving element forward and rearward movements and effectively snub any pressure surges in said bore.

4. The lubricant injector of claim 3 wherein said valving element forward projection carries a forwardly closing poppet surface to engage on outlet poppet seat at said outlet when said valving element is in its forward most position.

5. The lubricant injector of claim 4 wherein said larger and smaller diameter piston sections carry O-rings of polyurethane rubber with molybdenum disulfide filler which slidingly and sealingly engage said central and rearward chambers respectively.

6. The lubricant injector of claim 4 wherein said forward projection carries a quad-ring of polyurethane rubber with molybdenum disulfide filler for sealingly and slidably engaging said forward chamber.

7. The lubricant injector of calim wherein the ratio of said first face effective surface area to said second face effective surface area is in the range of 1:1.1 to 1:2.

8. The lubricant injector of claim 1 wherein the ratio of said first face effective surface area to said valving element surface area exposed to inlet pressure is in the range of 2:1 to 20:1.

9. The lubricant injector of claim 1 wherein said hollow body comprises a forward body piece threadably received in a rearward body piece, the volume of said charging chamber adjustable by varying the extent to which said forward piece is threaded into said rearward piece.

10. The lubricant injector of claim 9 wherein an exterior annular groove is formed at the intersection of said forward and rearward body pieces, said groove for receiving annular spacers of varying axial length for selectively varying the extent to which said forward piece is threaded into said rearward piece thereby selectively varying the volume of said charging chamber.

11. The lubricant injector of claim 10 wherein said annular spacers are of different colors corresponding to different axial lengths giving visual indication of the volume to which the charging chamber is set.

12. The lubricant injector of claim 1 wherein the inlet to said piston bore carries a perforated plug which serves as a filter element and a pressure surge snubbing element.

13. The lubricant injector of claim 1 wherein the inlet to said hollow body includes a portion adapted to receive a tube end thereby enabling the inlet to act as a tube fitting.

14. A lubricant injector comprising:
a hollow body having an inlet for connection to a source of intermittent pressurized lubricant,
an outlet,
a first chamber adjacent the inlet, a second chamber adjacent the outlet and a third chamber interposed between said first and second chambers, said third chamber having a larger interior diameter than said first and second chamber thereby defining a first and second shoulder at the intersection of the third chamber with the first and second chambers respectively,
a piston slidably and sealing disposed in said hollow body, said piston having a smaller diameter section disposed in said first chamber and a larger diameter section disposed in said third chamber,
said piston having first and second faces at its rearward and forward end respectively; said piston and said third chamber defining a charge chamber when said piston is in its rearward most position,
an axial bore through said piston and forming a valve seat at the forward end,
a valve means cooperating with said valve seat for controlling the flow of lubricant through said bore, said valve means having a rearwardly extending projection slidably disposed in said axial bore, having a forwardly extending projection which is sealing and slidably disposed in said second chamber and a forwardly opening poppet surface interposed between said projection for engagement with said seat, the effective area of the poppet surface exposed to fluid pressure in said bore being smaller than said first piston face, and means for biasing said valve means rearwardly to seat said poppet surface on said valve seat and biasing said piston rearwardly to engage said second shoulder.

15. A lubricant injector comprising:
an inlet manifold having an inlet bore for connection to a source of intermittently pressurized lubricant and a body receiving bore therethrough, said body receiving bore intersecting said inlet bore;
a hollow body having an inlet and an outlet, said hollow body comprising a forward body piece threadably received in one end of said body receiving bore and a rearward body piece threadably received in the other end of said body receiving bore, said hollow body defining a forward chamber adjacent the inlet, a rearward chamber adjacent the outlet and a central chamber of larger interior diameter than said forward and rearward chambers thereby defining a first shoulder at the intersection of the central with the forward chamber, said inlet comprising the intersection of said rearward chamber and said inlet bore, said rearward body piece having an axial bore therethrough and a threaded end plug sealing said rearward body piece axial bore,
a piston slidably and sealingly disposed within said body, said piston having a smaller diameter section received in said rearward chamber and a larger diameter section received in said central chamber, said piston limited in its forward and rearward axial movement by said larger diameter section contacting said first shoulder and said smaller diameter section contacting said end plug respectively, said piston having a first face at the rear end of its larger diameter section and a second larger face at the forward end of its larger diameter section, said piston defining a charging chamber ahead of its second face when said piston is in its rearwardly most position, said piston having an axial bore from its second face to point within its smaller diameter section and a radial bore from the exterior of said smaller diameter section to said point, said radial bore in fluid communication with said inlet for all positions of said piston, said axial bore having a poppet seat at its forward end;

a valving element cooperating with said poppet seat for controlling the flow of lubricant through said bore, said valving element having a rearwardly extending projection slidably received in said piston bore, a forwardly extending projection for sealing and sliding engagement in said forward chamber and a forwardly opening poppet surface interposed said projections for engagement with said poppet seat; the effective area of said poppet exposed to fluid pressure in said bore being substantially smaller than said first piston face, and means biasing said valve member rearwardly to seat said poppet surface on said poppet seat and biasing said piston rearwardly to engage said end plug.

16. The injector of claim 15 wherein lubricant pressure at said inlet sufficient to overcome said bias is operable to:
    a. upon initial application of pressure move said piston and valving element forward in unison injecting lubricant from said charging chamber out said outlet,
    b. upon continued application of pressure effect engagement of said piston with said first shoulder thereby stopping said piston and forcing said valving element forward to disengage said poppet surface from said poppet seat opening said piston bore and forcing said forward project into said forward chamber sealing and outlet,
    c. upon further application of pressure equalizing pressure on both faces of said piston thereby driving said piston rearwardly to engage said end plug and recharge said charging chamber,
    d. upon termination of pressure allowing said bias to return said valving element poppet surface to seat on said poppet seat and completing the injecting cycle.

17. The lubricant injector of claim 15 wherein said end plug is variably threadable into said rearward body piece to variably extend into said rearward cavity to adjust said charging chamber volume.

18. The lubricant injector of claim 17 wherein said end plug carries visible indica of said charging chamber volume.

19. The lubricant injector of claim 17 wherein said end plug has an axial bore therethrough and said piston has a rearwardly extending indicating rod which extends through and sealingly and slidingly engages said end plug bore to give visual indication of said injector operation.

20. The injector of claim 17 wherein a perforated member is interposed said inlet bore and said inlet.

21. The lubricant injector of claim 17 wherein said larger and smaller diameter piston sections carry O-rings of polyurethane rubber with molybdenum disulfide filler with slidingly and sealingly engage said central and rearward chambers respectively.

22. The lubricant injector of claim 21 wherein said valving element forwardly extending projection carries a quad-ring of polyurethane rubber with molybdenum disulfide filler for sealingly and slidably engaging said forward chamber.

23. A single line lubricating device comprising:
    a block manifold having an inlet bore for connection to a source of intermittently pressurized lubricant and a plurality of body receiving bores therethrough, each of said body receiving bores intersection said inlet bore;
    a plurality of hollow bodies having an inlet and an outlet, said hollow bodies comprising a forward body piece threadably received in one end which said body receiving bore and a rearward body piece threadably received in the other end of said body receiving bore, said hollow body defining a forward chamber adjacent the inlet, a rearward chamber adjacent the outlet and a central chamber interposed said forward and rearward chambers, said central chamber of larger interior diameter than said forward and rearward chambers thereby defining a first shoulder at the intersection of the central with the forward chambers, said inlet comprising the intersection of said rearward chamber and said inlet bore, said rearward body piece having an axial bore therethrough and a threaded end plug sealing said rearward body piece axial bore;
    a piston slidably and sealingly disposed within said body, said piston having a smaller diameter section received in said rearward chamber and a larger diameter section received in said central chamber, said piston limited in its forward and rearward axial movement by said larger diameter section contacting said first shoulders and said smaller diameter section contacting said end plug respectively, said piston having a first face at the rear end of its larger diameter section and a second larger face at the forward end of its larger diameter section, said piston defining a charging chamber ahead of its second face when said piston is in its rearwardly most position, said piston having an axial bore from its second face to point within its smaller diameter section and a radial bore from the exterior of said smaller diameter section to said point, said radial bore in fluid communication with said inlet for all positions of said piston, said axial bore having a poppet seat at its forward end;
    a valving element cooperating with said poppet seat for controlling the flow of lubricant through said bore, said valving element having a rearwardly extending projection slidably received in said piston bore, a forwardly extending projection for sealing and sliding engagement in said forward chamber and a forwardly opening poppet surface interposed said projections for engagement with said poppet seat; the effective area of said poppet exposed to fluid pressure in said bore being substantially smaller than said first piston face; and
    means biasing said valve member rearwardly to seat said poppet surface on said poppet seat and biasing said piston rearwardly to engage said end plug.

24. The injector of claim 23 wherein lubricant pressure at said inlet sufficient to overcome said bias is operable to:
  a. upon initial application of pressure move said piston and valving element forward in unison injecting lubricant from said charging chamber out said outlet,
  b. upon continued application of pressure effect engagement of said piston with said first shoulder thereby stopping said piston and forcing said valving element forward to disengage said poppet surface from said poppet seat opening said piston bore and forcing said forward project into said forward chamber sealing and outlet,
  c. upon further application of pressure equalizing pressure on both faces of said piston thereby driving said piston rearwardly to engage said end plug and recharge said charging chamber,
  d. upon termination of pressure allowing said bias to return said valving element poppet surface to seat on said poppet seat and completing the injecting cycle.

25. The lubricating device of claim 24 wherein said block manifold has a pressure tap bore leading from said inlet bore to the exterior of said block manifold.

26. The lubricating device of claim 25 wherein said pressure tap is utilized to supply pressurized lubricant to a pressure operated device.

27. The lubricating device of claim 26 wherein said pressure operated device is a lubricant injector.

28. The lubricating device of claim 26 wherein said pressure operated device is a pressure indicating device.

* * * * *